(12) United States Patent
Seo et al.

(10) Patent No.: US 11,156,898 B2
(45) Date of Patent: Oct. 26, 2021

(54) APERTURE MODULE, CAMERA MODULE, AND PORTABLE ELECTRONIC DEVICE

(71) Applicant: Samsung Electro-Mechanics Co., Ltd., Suwon-si (KR)

(72) Inventors: Bo Sung Seo, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 139 days.

(21) Appl. No.: 16/589,499

(22) Filed: Oct. 1, 2019

(65) Prior Publication Data
US 2020/0301246 A1   Sep. 24, 2020

(30) Foreign Application Priority Data

Mar. 21, 2019   (KR) .................... 10-2019-0032184

(51) Int. Cl.
| H04N 5/225 | (2006.01) |
| G03B 9/06 | (2021.01) |
| H04N 5/232 | (2006.01) |
| G03B 13/36 | (2021.01) |

(52) U.S. Cl.
CPC .............. *G03B 9/06* (2013.01); *G03B 13/36* (2013.01); *H04N 5/2252* (2013.01); *H04N 5/2254* (2013.01); *H04N 5/23287* (2013.01)

(58) Field of Classification Search
CPC ................................................. H04N 5/2252
USPC ................................................... 348/208.11
See application file for complete search history.

(56) References Cited

U.S. PATENT DOCUMENTS

| 7,085,032 | B2 | 8/2006 | Sato | |
| 7,573,629 | B2 | 8/2009 | Bai | |
| 9,366,941 | B2 | 6/2016 | Yoshizawa et al. | |
| 2006/0033974 | A1* | 2/2006 | Sato | G03B 21/2053 |
| | | | | 359/227 |
| 2009/0034046 | A1* | 2/2009 | Bai | G03B 9/10 |
| | | | | 359/230 |
| 2012/0076486 | A1 | 3/2012 | Bai et al. | |
| 2015/0346583 | A1 | 12/2015 | Yoshizawa et al. | |

(Continued)

FOREIGN PATENT DOCUMENTS

| CN | 101359149 A | 2/2009 |
| CN | 203490445 U | 3/2014 |
| CN | 105190425 A | 12/2015 |

(Continued)

OTHER PUBLICATIONS

Korean Office Action dated Jun. 9, 2020 in counterpart Korean Patent Application No. 10-2019-0032184 (6 pages in English and 5 pages in Korean).

(Continued)

*Primary Examiner* — Joel W Fosselman
(74) *Attorney, Agent, or Firm* — NSIP Law

(57) ABSTRACT

An aperture module includes a rotary plate disposed on an upper portion of a base, an aperture driving unit rotating the rotary plate, and four blades interlocked with rotation of the rotary plate, and forming entrance holes having various sizes through combinations. The four blades are disposed on respective fixing shafts disposed on the base and rotated and driven around the respective fixing shafts, and the fixing shafts are interconnected to form a rectangle having a long side and a short side.

19 Claims, 12 Drawing Sheets

(56) References Cited

U.S. PATENT DOCUMENTS

2018/0164537 A1 6/2018 Lee
2018/0343370 A1 11/2018 Park et al.

FOREIGN PATENT DOCUMENTS

| | | |
|---|---|---|
| CN | 208581281 U | 3/2019 |
| KR | 10-2009-0048841 A | 5/2009 |
| KR | 10-2012-0032433 A | 4/2012 |
| KR | 10-2012-0133910 A | 12/2012 |
| KR | 10-2014-0146919 A | 12/2014 |
| KR | 10-1477247 B1 | 12/2014 |
| KR | 10-2016-0085075 A | 7/2016 |
| KR | 10-2018-0065687 A | 6/2018 |
| WO | WO 2014/136457 A1 | 9/2014 |
| WO | WO 2016/111439 A1 | 7/2016 |

OTHER PUBLICATIONS

Chinese Office Action dated Apr. 30, 2021 in counterpart Chinese Patent Application No. 201911291664.7 (11 pages in English and 12 pages in Chinese).

\* cited by examiner

APERTURE MODULE, CAMERA MODULE, AND PORTABLE ELECTRONIC DEVICE

CROSS-REFERENCE TO RELATED APPLICATIONS

This application claims the benefit under 35 USC 119(a) of Korean Patent Application No. 10-2019-0032184 filed on Mar. 21, 2019, in the Korean Intellectual Property Office, the entire disclosure of which is incorporated herein by reference for all purposes.

BACKGROUND

1. Field

The present disclosure relates to an aperture module, a camera module, and a portable electronic device.

2. Description of the Background

Recently, camera modules have generally been installed in portable electronic devices such as tablet personal computers (PCs), laptop computers, and the like, in addition to smartphones. In the case of a digital camera, in order to change an amount of incident light depending on the light capturing environment, a mechanical aperture may be provided. However, in the case of a camera module used in a small product such as a portable electronic device, it may be difficult to provide an aperture separately, due to structural features and space limitations.

As an example, due to various components for driving an aperture, the weight of a camera module may become heavy, so the autofocusing or optical image stabilization may be degraded. Moreover, when a power connection unit such as a coil for driving an aperture is provided in an aperture itself, the power connection unit may be locked due to vertical movement of a lens during autofocusing.

Moreover, a function for precisely controlling an entrance hole of an aperture module to have various sizes while reducing the usage of a current may be required.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an aperture module includes a rotary plate disposed on an upper portion of a base, an aperture driving unit driving rotation of the rotary plate, and four blades interlocked with rotation of the rotary plate, and forming entrance holes having various sizes through combinations, wherein the four blades are disposed on respective fixing shafts disposed on the base and rotated and driven around the respective fixing shafts, and the fixing shafts are interconnected to form a rectangle having a long side and a short side.

The four blades may be interlocked with respective driving shafts disposed on the rotary plate and driven by rotation of the rotary plate. Two blades, among the four blades, may share a driving shaft of the driving shafts.

Each driving shaft may be disposed between two fixing shafts, which are adjacent to each other.

Each driving shaft may be disposed to pass through a point spaced apart from the two adjacent fixing shafts by the same distance according to rotation of the rotary plate.

When each driving shaft is located at the point spaced apart from the two adjacent fixing shafts by the same distance, the driving shaft may be disposed outside the short side of the rectangle.

The driving shafts may be disposed outside the rectangle.

The two blades disposed on the shared driving shaft may be disposed to overlap each other.

Blades not sharing a driving shaft, among the four blades, may be disposed at substantially the same position in an optical axis direction.

The rotary plate and the four blades may be mutually stacked to form three layers.

The four blades may be divided by two and disposed in two layers. Two blades disposed in the same layer may have the same shape.

The four blades may serve as a stopper among blades disposed in the same layer.

The entrance holes implemented due to combination of the four blades may be octagonal.

The aperture driving unit may include a moving portion including a driving magnet, the moving portion reciprocating linearly. The moving portion may be disposed outside the long side of the rectangle.

The rotary plate and the moving portion may selectively include a driving projection or a guide hole, and the driving projection may be inserted into the guide hole.

The driving projection may have a shape protruding in an optical axis direction.

The guide hole may be a groove having a semicircular shape which is open in a direction perpendicular to an optical axis direction.

A camera module may include a housing, a lens module accommodated in the housing, the aperture module disposed on the lens module, a first optical image stabilization (OIS) driving coil providing driving force to move the lens module in a first direction perpendicular to an optical axis direction, a second OIS driving coil providing driving force to move the lens module in a second direction perpendicular to the optical axis direction and the first direction, and an autofocus (AF) driving coil providing driving force to move the lens module in the optical axis direction, wherein the aperture driving unit may include an aperture driving coil facing a driving magnet disposed in a moving portion on the base driving the rotation of the rotary plate.

A portable electronic device may include the camera module, an image sensor configured to convert light that passes through the lens module into an electrical signal, and a display configured to convert the electrical signal into a display image.

In another general aspect, a camera module includes a housing, a lens module accommodated in the housing, and an aperture module forming octagonal entrance holes having various sizes with four blades, wherein the four blades are disposed on respective fixing shafts disposed on a base, and the respective fixing shafts are interconnected to form a rectangle having a long side and a short side, and wherein four sides, parallel in an optical axis direction of the housing, have a first OIS driving coil providing driving force to move the lens module in a first direction, perpendicular to an optical axis direction, a second OIS driving coil providing driving force to move the lens module in a second direction, perpendicular to the optical axis direction and the first direction, an autofocus (AF) driving coil providing driving force to move the lens module in the optical axis direction, and an aperture driving coil driving the blades of the aperture module.

In another general aspect, an aperture module includes a base having an opening passing incident light, and fixing shafts disposed on the base outward from the opening, a rotary plate rotatably disposed on the base having a through-hole passing light to the opening and driving shafts disposed on the rotary plate outward from the through-hole, and blades pivotably disposed on the fixing shafts and coupled to the rotary plate by the driving shafts to pivot by rotation of the rotary plate to adjust incident light to the through-hole.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
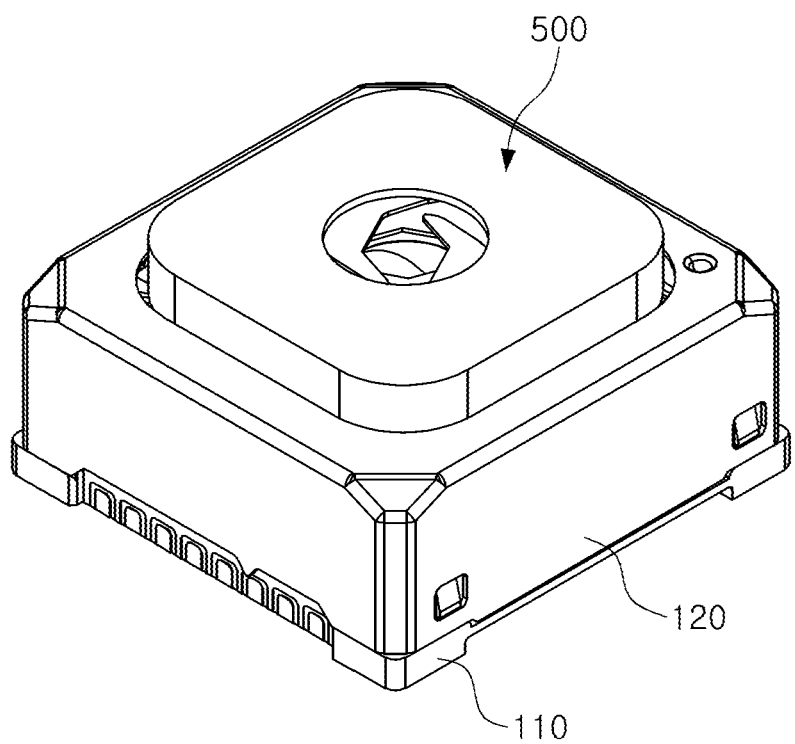
FIG. 1 is a perspective view of a camera module according to one or more examples.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The present disclosure may be exemplified in many different forms and should not be construed as being limited to the specific examples set forth herein. Rather, these examples are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. As used herein, the term "and/or" includes any one and any combination of any two or more of the associated listed items; likewise, "at least one of" includes any one and any combination of any two or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer, or section from another member, component, region, layer, or section. Thus, a first member, component, region, layer, or section discussed below could be termed a second member, component, region, layer or section without departing from the description of the examples.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing various examples only, and is not to be used to limit the disclosure. As used herein, the singular forms "a," "an," and "the" are intended to include the plural forms as well, unless the context clearly indicates otherwise. It will be further understood that the terms "comprises," "comprising," "includes," and/or "has" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, one or more examples of the present disclosure will be described with reference to schematic views illustrating one or more examples of the present disclosure. In the drawings, for example, due to manufacturing techniques and/or tolerances, modifications of the shape shown may be estimated. Thus, examples of the present disclosure should not be construed as being limited to the particular shapes of regions shown herein, for example, examples of the present disclosure may be construed to include a change in shape due to manufacturing.

The following examples may also be constituted by one or a combination thereof. The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

One or more examples of an aperture module capable of implementing a diameter of an aperture in multiple stages or successively and precisely, while reducing the use of a current are described herein.

A camera module according to one or more examples of the present disclosure may be mounted in a portable electronic device, such as a mobile communications terminal, a smartphone, or a tablet PC.

Figure 2:
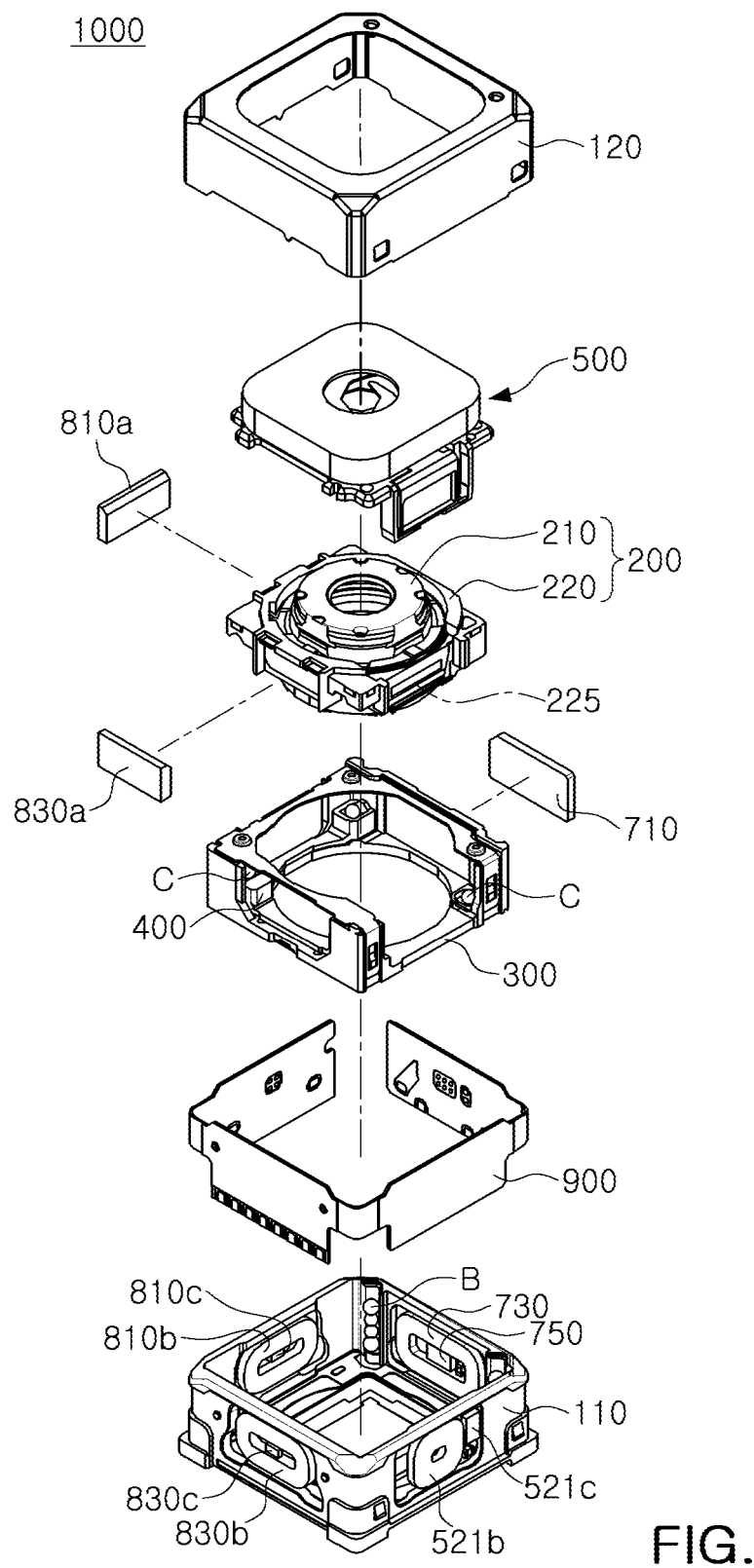
FIG. 2 is an exploded perspective view of a camera module according to one or more examples.
Figure 3A:
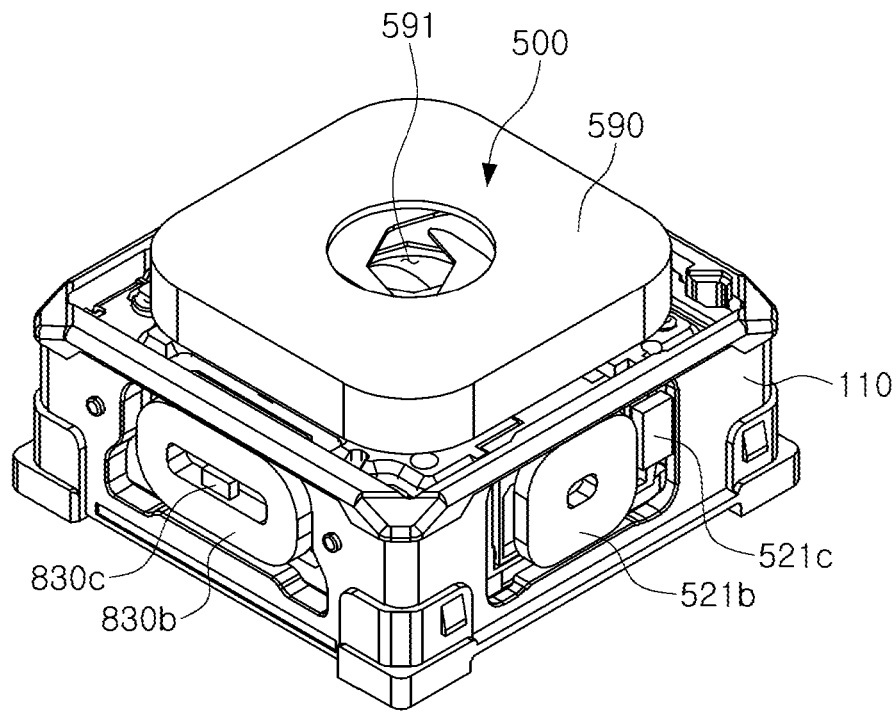
FIG. 3A is a perspective view of a portion of a camera module according one or more examples.
Figure 3B:
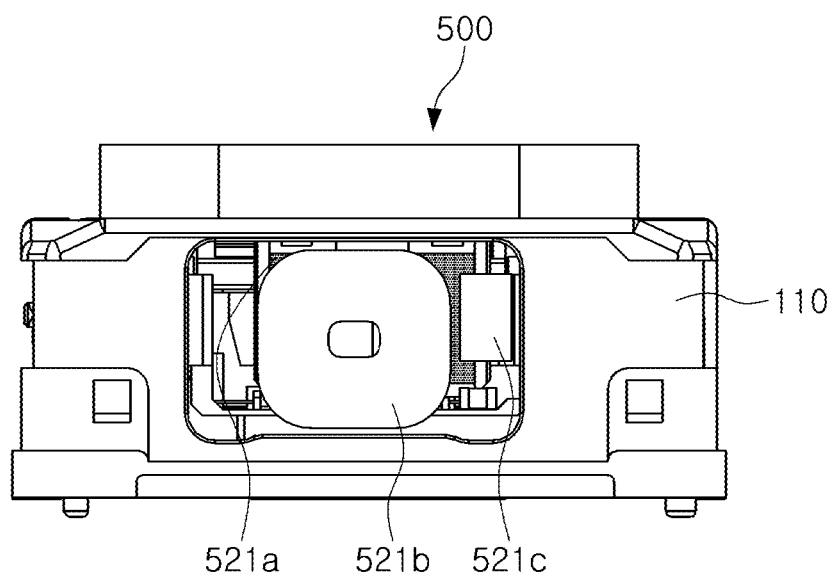
FIG. 3B is a side view of FIG. 3A.

FIG. 1 is a perspective view of a camera module according to one or more examples, and FIG. 2 is an exploded perspective view of a camera module according to one or more examples. Moreover, FIG. 3A is a perspective view of a portion of a camera module according to one or more examples, and FIG. 3B is a side view of FIG. 3A.

Referring to FIGS. 1 to 3B, a camera module 1000 according to one or more examples may include a lens module 200, a carrier 300, a guide portion 400, an aperture module 500, a housing 110, and a case 120.

The lens module 200 may include a lens barrel 210 having a plurality of lenses capturing an image of a subject and a holder 220 accommodating the lens barrel 210. The plurality of lenses are disposed inside the lens barrel 210 along an optical axis. The lens module 200 may be accommodated in the carrier 300.

The lens module 200 may be configured to be moved in an optical axis direction for focusing. As an example, due to a focus adjusting unit, the lens module 200 may be moved in an optical axis direction, together with the carrier 300.

The focus adjusting unit includes a magnet 710 and a coil 730, generating driving force in the optical axis direction. Moreover, a position sensor 750, for example, a hall sensor may be provided to sense a position of the lens module 200, that is, the carrier 300 in the optical axis direction.

The magnet 710 may be mounted on the carrier 300. As an example, the magnet 710 may be mounted on one side of the carrier 300.

The coil 730, the autofocus (AF) driving coil, and the position sensor 750 may be mounted in the housing 110. As an example, the coil 730 and the position sensor 750 may be fixed to the housing 110 to oppose the magnet 710. The coil 730 and the position sensor 750 may be provided on a substrate 900, and the substrate 900 may be mounted in the housing 110.

The magnet 710 is provided as a moving member mounted on the carrier 300 to move in the optical axis direction together with the carrier 300, while the coil 730 and the position sensor 750 are provided as a fixed member fixed to the housing 110.

When power is applied to the coil 730, the carrier 300 may be moved in the optical axis direction due to electromagnetic influence between the magnet 710 and the coil 730. Moreover, the position sensor 750 may sense a position of the carrier 300 in the optical axis direction.

[Since the lens module 200 is accommodated in the carrier 300, the lens module 200 is also moved together with the carrier 300 in the optical axis direction, due to movement of the carrier 300.

Moreover, the aperture module 500, mounted on an upper portion of the lens module 200, may also be moved together with the lens module 200 in the optical axis direction.

When the carrier 300 is moved, in order to reduce friction between the carrier 300 and the housing 110, a rolling member B may be provided between the carrier 300 and the housing 110. The rolling member B may have a ball shape.

The rolling member B may be disposed on both sides of the magnet 710 (or a coil 730).

A yoke may be mounted on the substrate 900. As an example, the yoke may be disposed to oppose the magnet 710 with the coil 730 interposed therebetween.

Attractive force may be applied in a direction, perpendicular to the optical axis direction between the yoke and the magnet 710.

Thus, due to the attractive force between the yoke and the magnet 710, a state in which the rolling member B is in contact with the carrier 300 and the housing 110 may be maintained.

Moreover, the yoke may function to focus a magnetic force of the magnet 710.

Accordingly, magnetic flux leakage may be reduced and/or prevented.

As an example, the yoke and the magnet 710 may form a magnetic circuit.

Moreover, in order to compensate for shaking of an image caused by a factor such as user hand-shake, the lens module 200 may be moved in a first direction, perpendicular to an optical axis, and a second direction, perpendicular to the optical axis and the first direction.

For example, an optical image stabilizer may compensate for shaking by applying relative displacement, corresponding to the shaking, to the lens module 200, when an image is captured and shaking occurs due to user hand-shake.

The guide portion 400 may be accommodated in the carrier 300 to be placed in an upper portion in the optical axis direction. In addition, a holder 220 may be placed in an upper portion of the guide portion 400. In addition, a ball member C, serving as a rolling bearing, may be provided between the carrier 300 and the guide portion 400 in the optical axis direction and between the guide portion 400 and the holder 220 in the optical axis direction.

When the lens module 200 is moved in the first direction and the second direction, perpendicular to an optical axis, the guide portion 400 is configured to guide the lens module 200.

As an example, the lens module 200 moves relative to the guide portion 400 in the first direction, while the guide portion 400 and the lens module 200 may be configured to move in the carrier 300 in the second direction.

An optical image stabilizer includes a plurality of magnets 810a and 830a as well as a plurality of coils 810b and 830b, a first optical image stabilizer (OIS) driving coil and a second OIS driving coil, for generation of driving force for shaking compensation. In addition, in order to sense a position of the lens module 200 in the first direction and the second direction, a plurality of position sensors 810c and 830c, for example, a hall sensor, may be provided.

Among the plurality of magnets 810a and 830a and the plurality of coils 810b and 830b, a portion of the plurality of magnets, a magnet 810a and a portion of the plurality of coils, a coil 810b, are disposed to oppose in the first direction to generate driving force in the first direction, and the remainder of the plurality of magnets, a magnet 830a and the remainder of the plurality of coils, a coil 830b, are disposed to be opposed in the second direction to generate driving force in the second direction.

The plurality of magnets 810a and 830a are mounted on the lens module 200, and the plurality of coils 810b and 830b and the plurality of position sensors 810c and 830c, opposing the plurality of magnets 810a and 830a, are fixed to the housing 110. As an example, the plurality of coils 810b and 830b, as well as the plurality of position sensors 810c and 830c, are provided in the substrate 900, and the substrate 900 is mounted on the housing 110.

The plurality of magnets 810a and 830a are provided as a moving member moving in the first direction and the second direction together with the lens module 200, while the plurality of coils 810b and 830b and the plurality of position sensors 810c and 830c are provided as a fixed member fixed to the housing 110.

Moreover, in the present example, a ball member C supporting the guide portion 400 and the lens module 200 is provided. The ball member C serves to guide the guide portion 400 and the lens module 200 in a shaking compensation process.

The ball member C may be provided between the carrier 300 and the guide portion 400, between the carrier 300 and the lens module 200, and between the guide portion 400 and the lens module 200.

When driving force is generated in a first direction, the ball member C, disposed between the carrier 300 and the guide portion 400, and between the carrier 300 and the lens module 200, may be rolled in the first direction. Accordingly, the ball member C may guide movement of the guide portion 400 and the lens module 200 in the first direction.

In addition, when driving force is generated in a second direction, the ball member C, disposed between the guide portion 400 and the lens module 200, and between the carrier 300 and the lens module 200, may be rolled in the second direction. Accordingly, the ball member C may guide movement of the lens module 200 in the second direction.

The lens module 200 and the carrier 300 may be accommodated in the housing 110. As an example, the housing 110 has an approximately rectangular box shape having an open upper portion and an open lower portion, and the lens module 200 and the carrier 300 are accommodated in an inner space of the housing 110.

A printed circuit board with an image sensor mounted thereon may be disposed in a lower portion of the housing 110.

The image sensor may convert the light incident through the lens module 200 into an electric signal. As an example, the image sensor may be a charge coupled device (CCD) or a complementary metal-oxide semiconductor (CMOS). The electric signal converted by the image sensor may be outputted as an image through a display unit 10 of a portable electronic device 1 (FIG. 9B).

The case 120 may be coupled to the housing 110 to surround an outer surface of the housing 110, and may function to protect internal components of the camera module. Moreover, the case 120 may function to block electromagnetic waves.

Figure 9A:
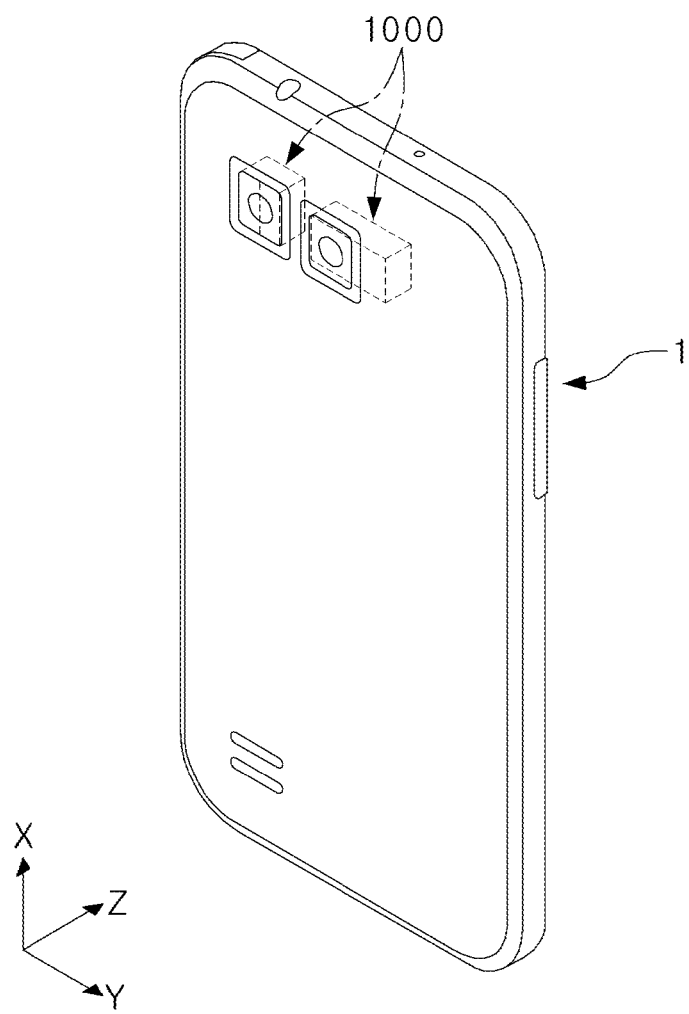
FIGS. 9A and 9B are perspective views illustrating one or more examples of a portable electronic device with an example camera module.
Figure 9B:
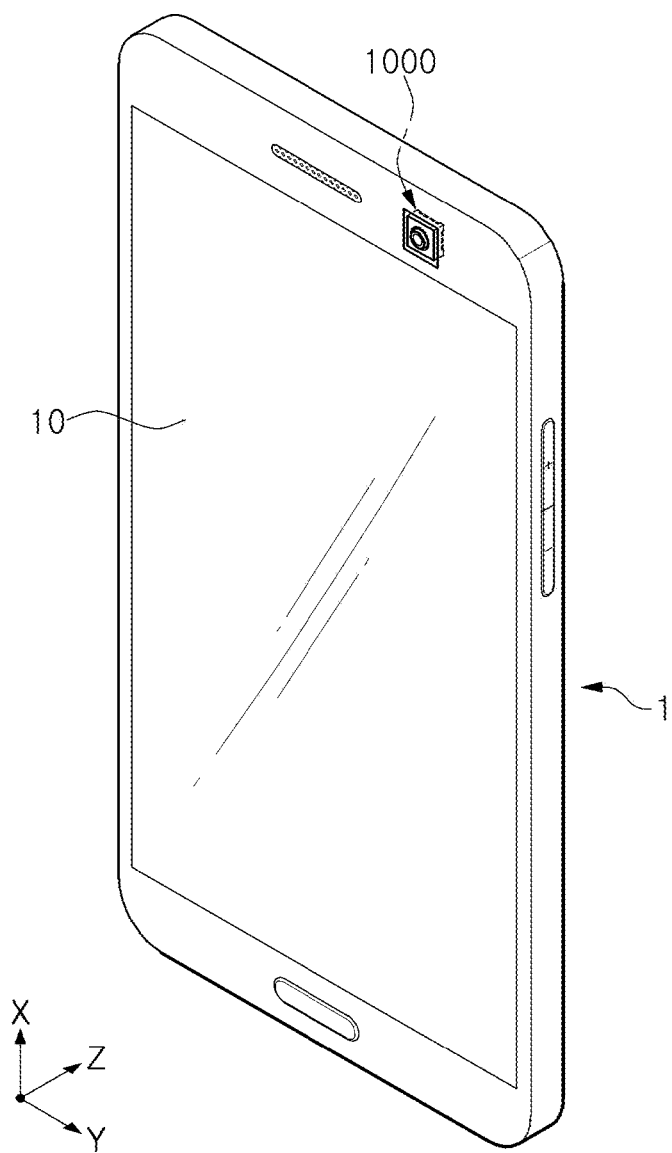

As an example, the case 120 may block electromagnetic waves in order to prevent the electromagnetic waves, generated by a camera module 1000, from affecting other electronic components in a portable electronic device 1 (FIGS. 9A and 9B).

Moreover, since various electronic components other than a camera module 1000 are mounted on a portable electronic device 1, the case 120 may block electromagnetic waves in order to prevent the electromagnetic waves, generated by the electronic components, from affecting the camera module 1000.

The case 120 is formed of a metallic material to be grounded to a ground pad provided in a printed circuit board, thus blocking electromagnetic waves.

The aperture module 500 is a device configured to selectively change an incident amount of light incident on the lens module 200.

As an example, the aperture module 500 may successively implement incidence holes having different sizes by a plurality of blades. Depending on the capturing environment, light may be incident through one of incident holes having various sizes.

Figure 4:
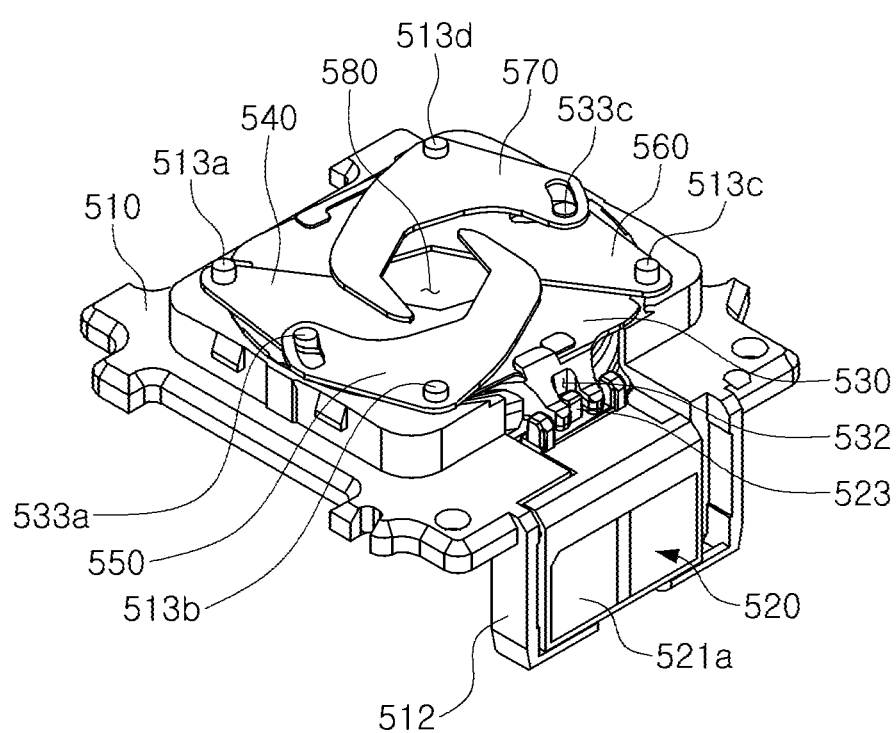
FIG. 4 is a combined perspective view in which a cover of an aperture module according to one or more examples is removed.
Figure 5:
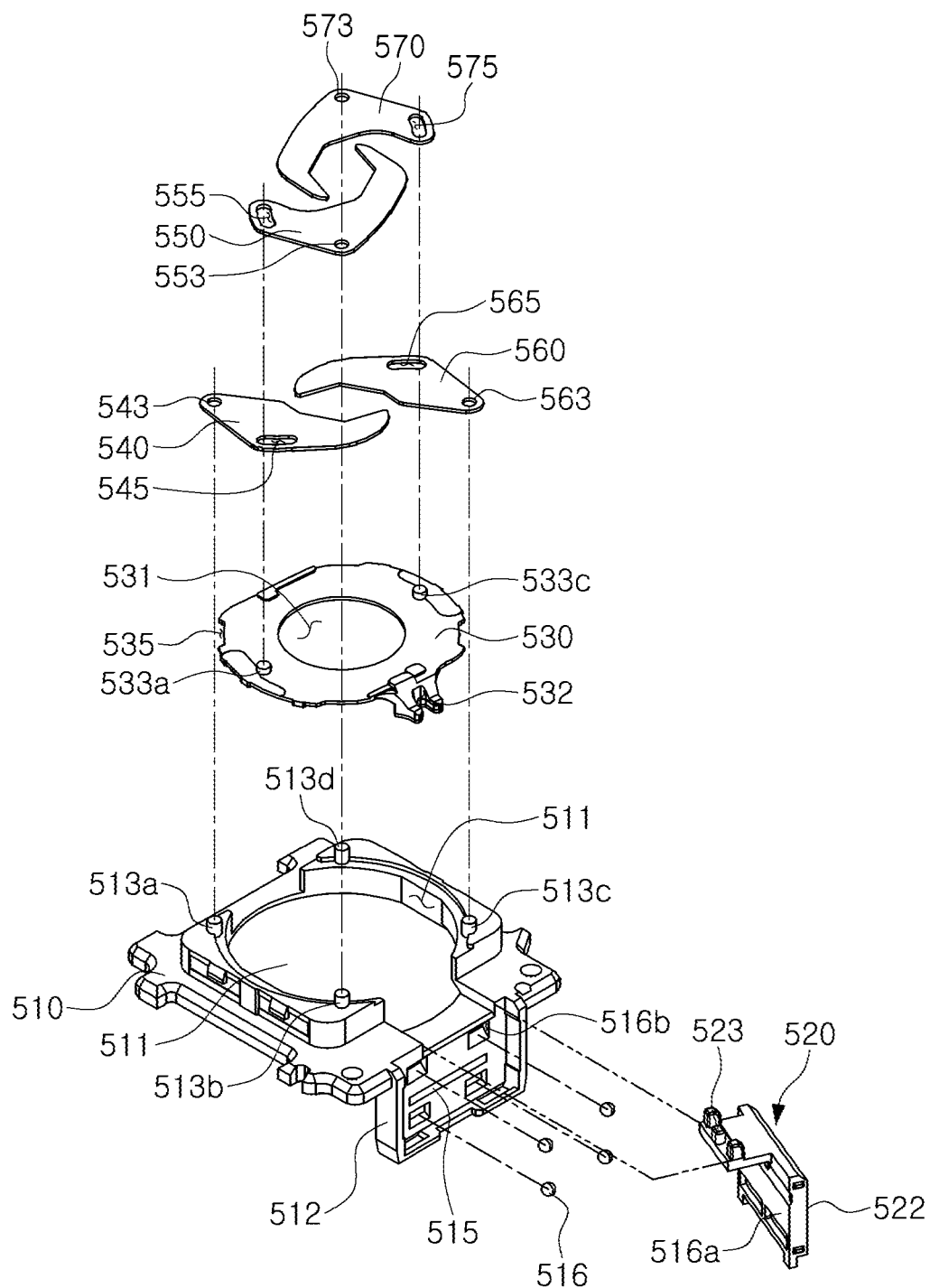
FIG. 5 is an exploded perspective view in which a cover of an aperture module according to one or more examples is removed.
Figure 6A:
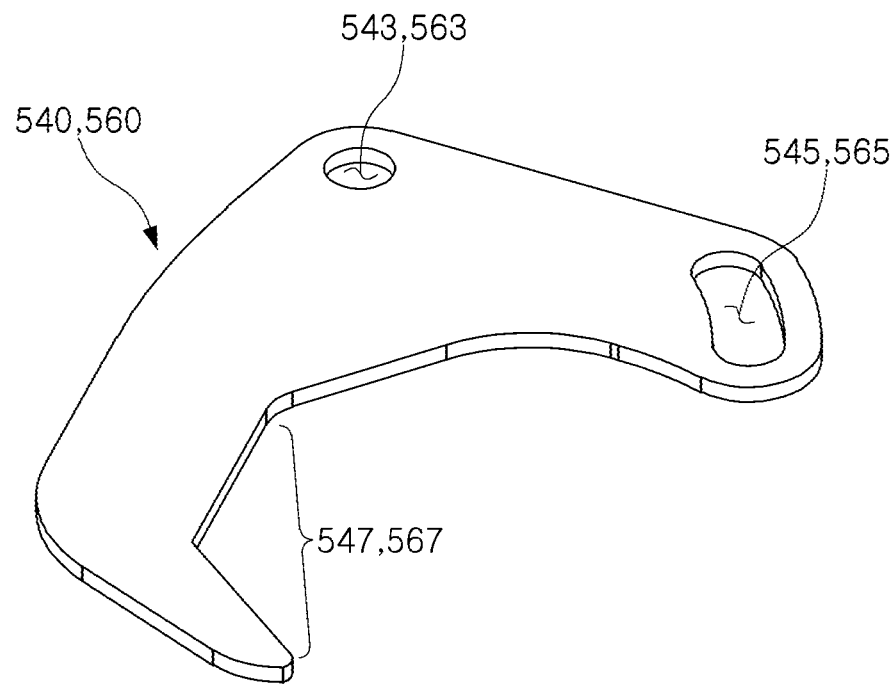
FIGS. 6A and 6B illustrate an example of a blade provided in an aperture module according to one or more examples.
Figure 6B:
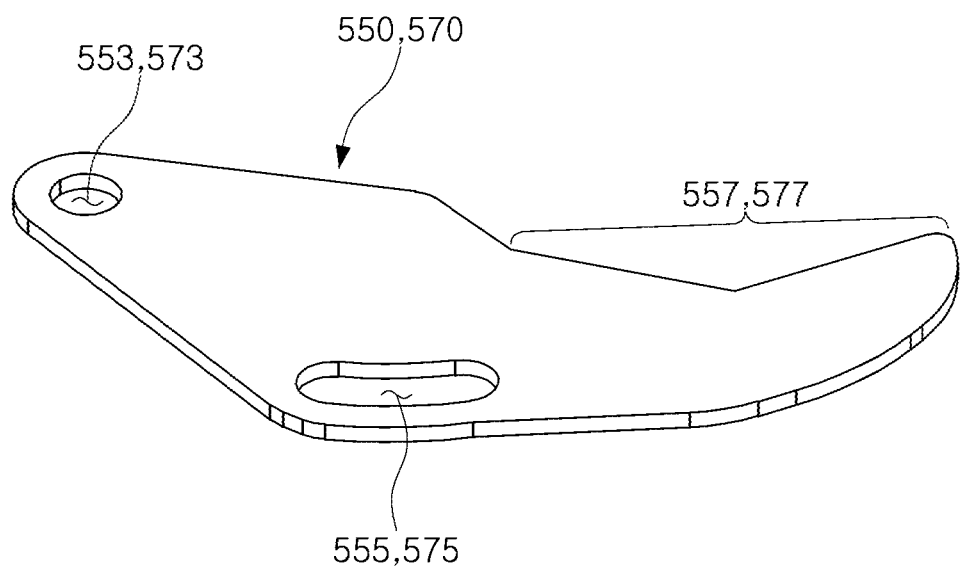

FIG. 4 is a combined perspective view of an aperture module according to one or more examples, and FIG. 5 is an exploded perspective view of blades and a rotary plate provided in one or more examples of an aperture module.

The aperture module 500 may be coupled to the lens module 200, and configured to selectively change an amount of incident light incident on the lens module 200.

A relatively small amount of light may be incident on the lens module 200 in a high illumination environment, while a relatively large amount of light may be incident on the lens module 200 in a low illumination environment. Thus, image quality may be maintained even under various illumination conditions.

The aperture module 500 may be configured to be coupled to the lens module 200 and moved in the optical axis direction, the first direction, and the second direction together with the lens module 200. That is, the lens module 200 and the aperture module 500 may move together during the focusing and the shaking compensation so that a distance between the lens module 200 and the aperture module 500 is not changed.

Referring to FIGS. 4 and 5, an aperture module 500 includes a base 510, a plurality of blades 540, 550, 560, and 570, and an aperture driving unit, and the aperture driving unit includes a moving portion 520, including a driving magnet 521a, and a driving coil 521b. Moreover, the aperture module may include a position sensor 521c (for example, a hall sensor) to precisely identify a position of the moving portion 520 and enable closed-loop control. Moreover, the aperture module may include a cover 590 covering the base 510 and the plurality of blades 540, 550, 560, and 570, and having a through-hole 591 onto which light is incident.

The aperture module 500 according to one or more examples includes, for example, a plurality of blades 540, 550, 560, and 570. Moreover, as illustrated in the drawings, the aperture module may have a structure including four blades, but examples are not limited thereto. Alternatively, the aperture module 500 may be applied to a case in which an even number of blades, for example, more than four blades, is included.

The first to fourth blades 540, 550, 560, and 570 may have a substantially boomerang shape, and an inner side portion, forming the entrance hole 580, may have a shape of a bent line "V." For example, as illustrated in the drawings, inner side portions 547, 557, 567, and 577 of the first to fourth blades 540, 550, 560, and 570 may have a shape of a bent line "V," and an octagonal entrance hole may be formed by the four blades.

Here, two blades, among a plurality of blades, are provided as a pair and the pair of blades has the same shape. Moreover, the blades having the same shape may be provided in the same position in an optical axis direction, that is, in the same layer, while opposing each other. For example, as illustrated in the drawings, each of a pair of the first and the third blades 540 and 560 as well as a pair of the second and the fourth blades 550 and 570 may be provided in the same layer. Accordingly, the rotary plate 530 and the four blades 540, 550, 560, and 570 may form a structure composed of three stacked layers.

In addition, as will be described later, blades, provided in the same layer, may serve as stoppers with respect to each other.

Here, the first and third blades 540 and 560, or the second and fourth blades 550 and 570, provided in the same layer, may have the same shape. Moreover, blades, disposed in the same layer, may be disposed to be symmetrical about an optical axis.

Due to combination of inner side portions of the first to fourth blades 540, 550, 560, and 570, an entrance hole 580 having a polygonal shape with the even number of sides may be implemented. As illustrated in the drawings, an octagonal entrance hole 580 may be implemented due to four blades, and the entrance hole 580 may be designed to successively implement a regular octagon.

In other words, the aperture module 500 according to the examples described herein, may be provided to allow the entrance hole 580, having a polygonal (or regular polygonal) shape with the even number of sides due to combination of the even number of blades, to have various sizes, successively or intermittently (in multiple stages).

In addition, the first to fourth blades 540, 550, 560, and 570 are slid while a portion of the first to fourth blades is in contact with each other, so antistatic processing may be performed so as not to generate frictional electricity. For example, a circuit and/or an antistatic coating may be used to reduce or prevent generation of static electricity.

Two blades, among the first to fourth blades 540, 550, 560, and 570, are provided as a pair, and the pair of blades may be disposed in parallel on the same plane. For example, the first and third blades 540 and 560 may be provided in a lower layer, while the second and fourth blades 550 and 570 may be provided in an upper layer (see FIG. 4). In this case, the blades, provided in the same layer, may serve as stoppers with respect to each other, and a plurality of blades are provided in the same layer without formation of a sequentially stacked structure, so the overall thickness of blades is reduced to implement a reduction in a thickness of an aperture module.

The first to fourth blades 540, 550, 560, and 570 may be interlocked with the rotary plate 530 to be driven.

The rotary plate 530 is interlocked with the moving portion 520 (for example, a magnet portion), linearly reciprocating in a direction perpendicular to an optical axis direction, and converting a linear motion of the moving portion 520 into rotary motion to perform rotary motion substantially around an optical axis. A through-hole 531 is provided at the center of the rotary plate 530 to allow light to pass therethrough, and the through-hole 531 may have a same, larger, or smaller size, compared with an entrance hole 580 having a maximum size, formed by the first to fourth blades 540, 550, 560, and 570. Moreover, the rotary plate 530 may be in contact with the first to fourth blades 540, 550, 560, and 570, so antistatic processing may be performed so as not to generate frictional electricity.

Accordingly, a guide groove 511 for guiding rotary motion of the rotary plate 530 may be provided in the base 510, and the rotary plate 530 may be inserted into the guide groove 511 to be guided so as to rotate. The rotary plate 530 may have an edge with a round shape. Also, a predetermined groove shape 535 (an avoiding groove) may be provided in the edge of the rotary plate so as to avoid interference with an adjacent member such as fixing shafts 513a, 513b, 513c, and 513d. Here, the guide groove 511 may also have an edge with a round shape to correspond to the rotary plate 530. Also, the fixing shafts 513a, 513b, 513c, and 513d may be provided in the edge of the rotary plate to be slightly led inwardly.

Also, even when the guide groove 511 is not provided, driving shafts 533a and 533c of the rotary plate 530 may be inserted into the four blades 540, 550, 560, and 570, so rotation may be induced naturally.

The first to fourth blades 540, 550, 560, and 570 may be interlocked with the rotary plate 530, being rotated, to be driven.

The first to fourth blades 540, 550, 560, and 570 include rotating shaft holes 543, 553, 563, and 573 as well as driving shaft holes 545, 555, 565, and 575, respectively, the rotating shaft holes 543, 553, 563, and 573 are disposed on the fixing shafts 513a, 513b, 513c, and 513d, provided in the base 510, to be rotated, respectively, and the driving shaft holes 545, 555, 565, and 575 are disposed to allow the driving shafts 533a and 533c of the rotary plate 530 to rotate and move. Here, two blades, among the first to fourth blades 540, 550, 560, and 570, are provided as a pair, and pairs of blades share driving shafts 533a and 533c. For example, the driving shaft holes 545 and 555 of the first and second blades 540 and 550 are disposed on a first driving shaft 533a, and the driving shaft holes 565 and 575 of the third and fourth blades 560 and 570 are disposed on a second driving shaft 533c.

Moreover, as will be described below, when the fixing shafts 513a, 513b, 513c, and 513d, rotating shafts on which four blades are disposed, respectively, are interconnected, a rectangle having a long side and a short side, shorter than the long side, may be formed. In addition, the driving shafts 533a and 533c of the rotary plate 530 may be provided in the short side of the rectangle.

Hereinafter, description of the rotating shaft holes 543, 553, 563, and 573, the driving shaft holes 545, 555, 565, and 575, and a guide hole 532 configured to transmit rotation or to transmit power by insertion of fixing shafts 513a, 513b, 513c, and 513d, driving shafts 533a and 533c, and a driving projection 523 thereinto, respectively, is presented. The aforementioned is referred to as a hole for convenience; however, the examples described herein are not so limited, and a hole may refer to, for example, a hole or groove shape.

The rotating shaft holes 543, 553, 563, and 573 of the first to fourth blades 540, 550, 560, and 570 may have a round shape, and may only be rotated while being inserted into the fixing shafts 513a, 513b, 513c, 513d.

In addition, the driving shaft holes 545, 555, 565, and 575 may be elongated, and the driving shafts 533a and 533c may move while the driving shafts 533a and 533c are inserted thereinto. In addition, the driving shaft holes 545, 555, 565, and 575 may be provided to be inclined in a rotation direction of the rotary plate 530.

The driving shafts 533a and 533c rotate (move) according to rotation of the rotary plate 530. Moreover, while the driving shafts 533a and 533c, inserted into the driving shaft holes 545, 555, 565, and 575 of the first to fourth blades 540, 550, 560, and 570, move, the first to fourth blades 540, 550, 560, and 570 may be narrowed inwardly or expanded outwardly, such that entrance holes 580 having various sizes in multiple stages or successively may be implemented.

Moreover, in an example, in order to significantly reduce consumption of a current and reduce sensitivity due to a manufacturing tolerance in a process in which blades are interlocked with rotational drive of the rotary plate 530, the driving shafts 533a and 533c are located in positions farthest away from the fixing shafts 513a, 513b, 513c, and 513d, provided as a rotating shafts.

Figure 7:
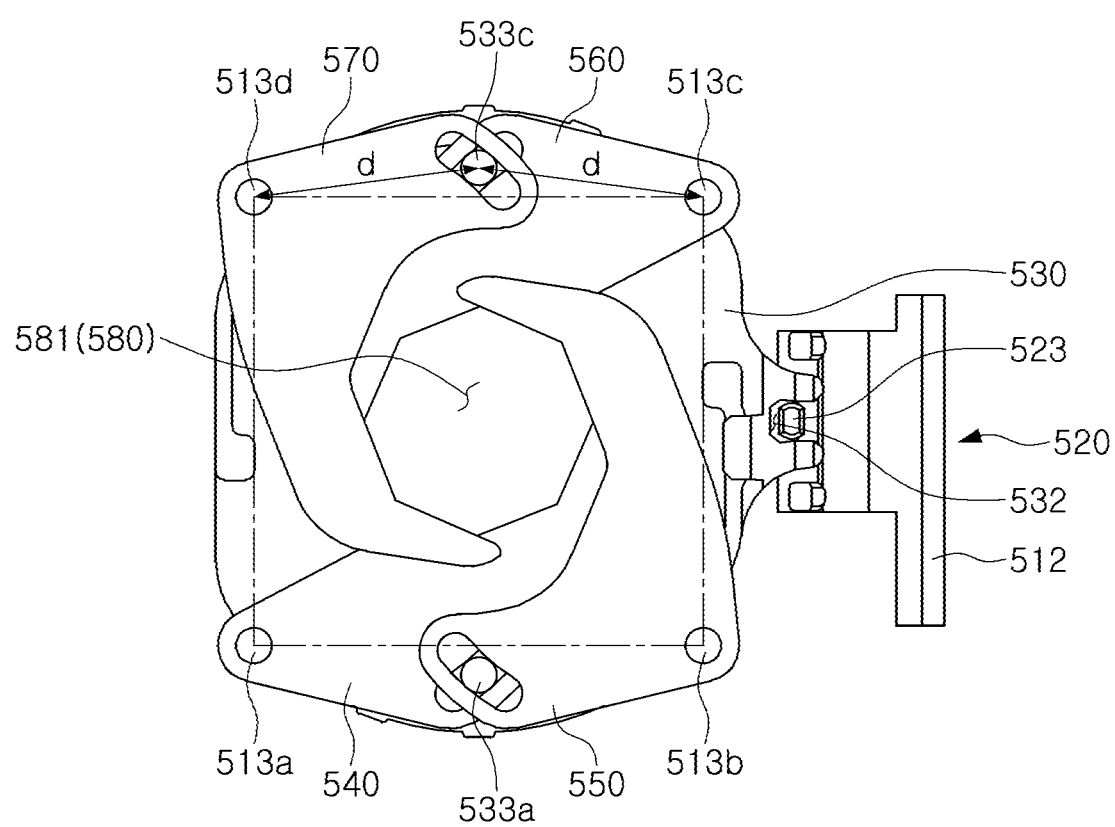
FIG. 7 is a reference drawing provided to explain the positional relationship of rotating shafts of a plurality of blades provided in an aperture module according to one or more examples.

In an example, when the fixing shafts 513a, 513b, 513c, and 513d, provided as rotating shafts on which four blades are disposed, respectively, are interconnected, not a square but a rectangle may be formed. In other words, when the fixing shafts 513a, 513b, 513c, and 513d, rotating shafts on which four blades are disposed, respectively, are interconnected, a rectangle having a long side and a short side, shorter than the long side, may be formed. In addition, the driving shafts 533a and 533c are provided between two fixing shafts, adjacent to each other, and the driving shafts 533a and 533c are provided to pass through a point spaced apart from two fixing shafts by the same distance (d) according to rotation of the rotary plate 530 (see FIG. 7).

Figure 8A:
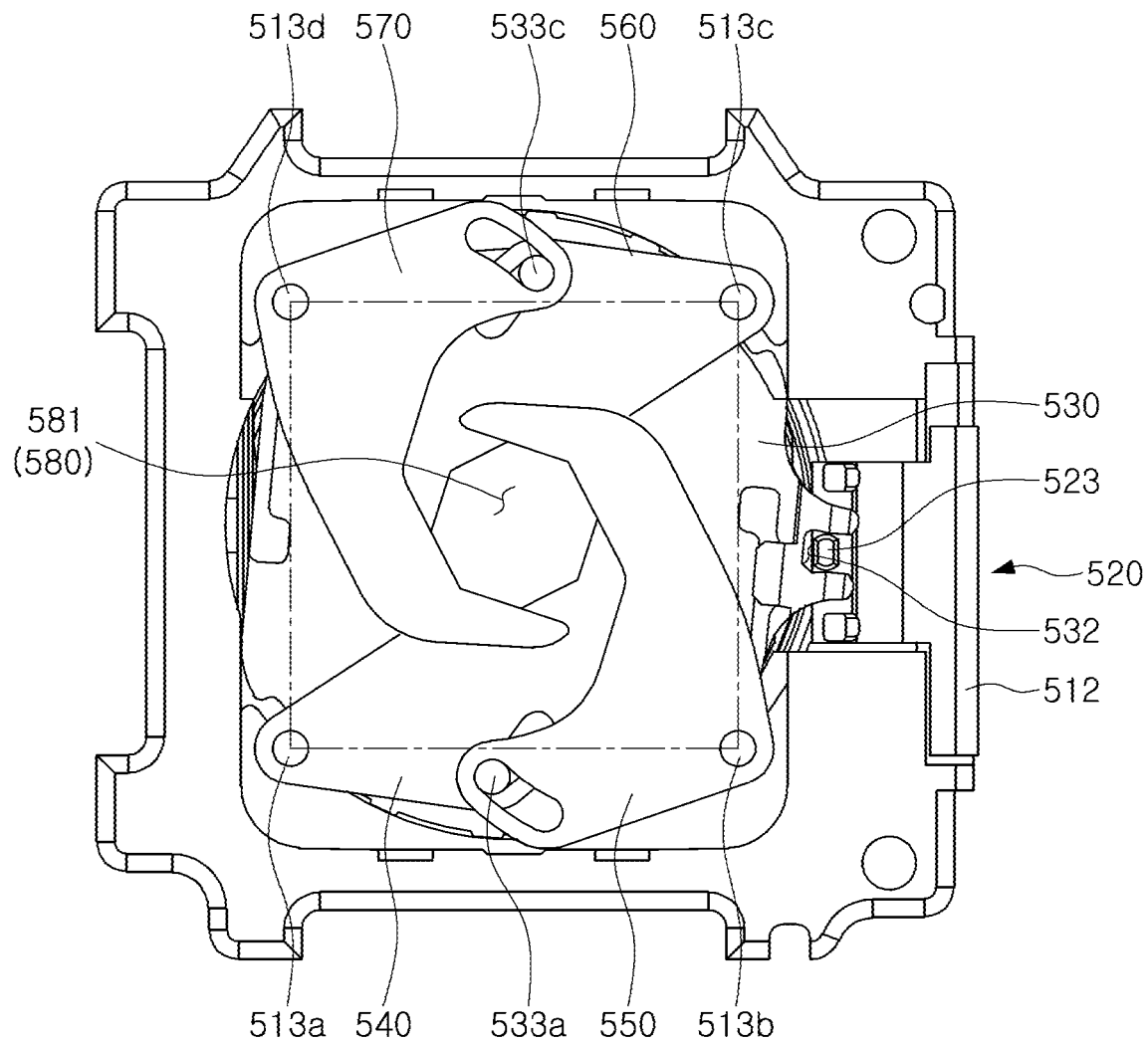
FIGS. 8A, 8B, and 8C are plan views illustrating an aperture module driven for a change in a size of an entrance hole according to one or more examples.
Figure 8B:
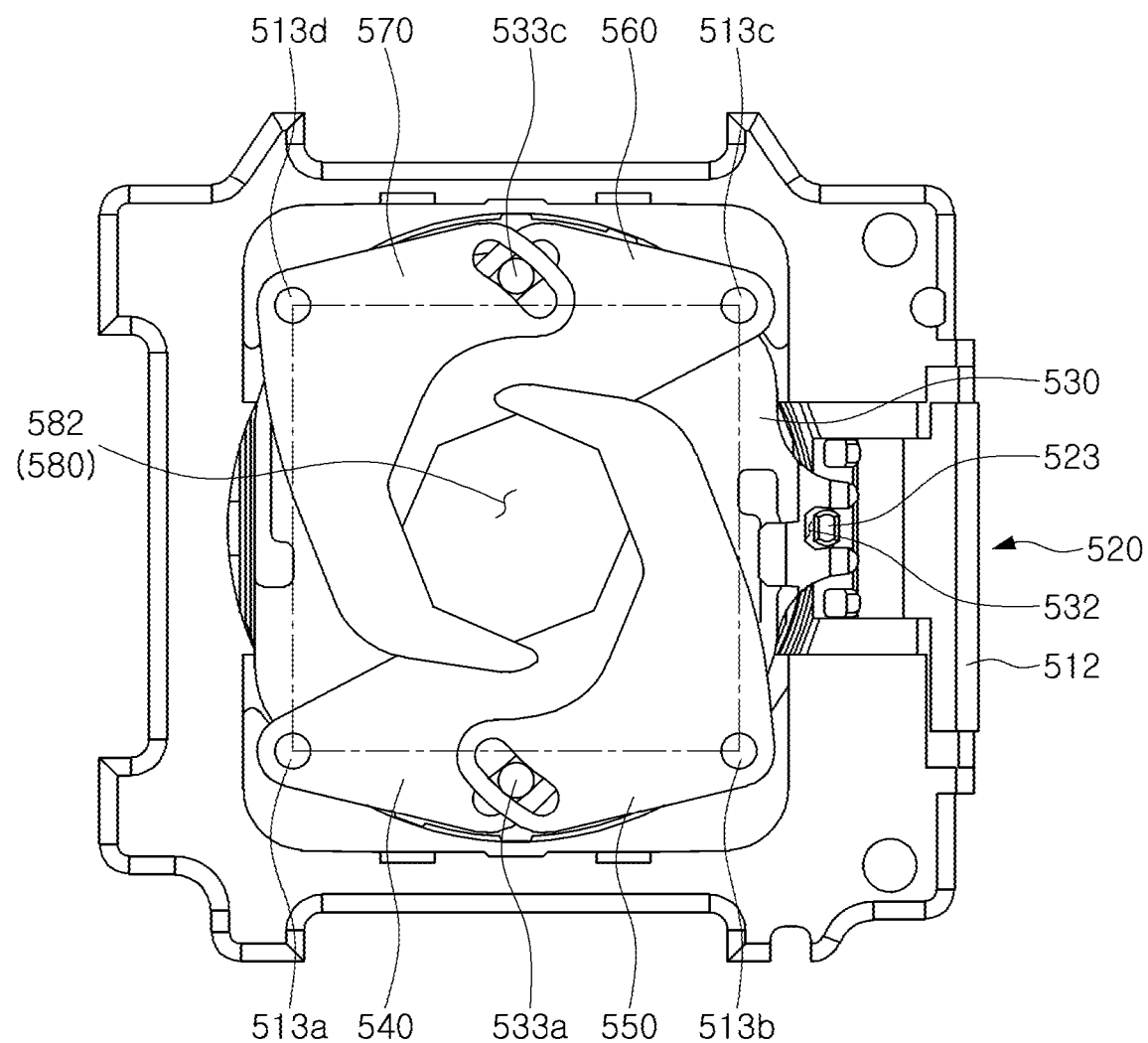
Figure 8C:
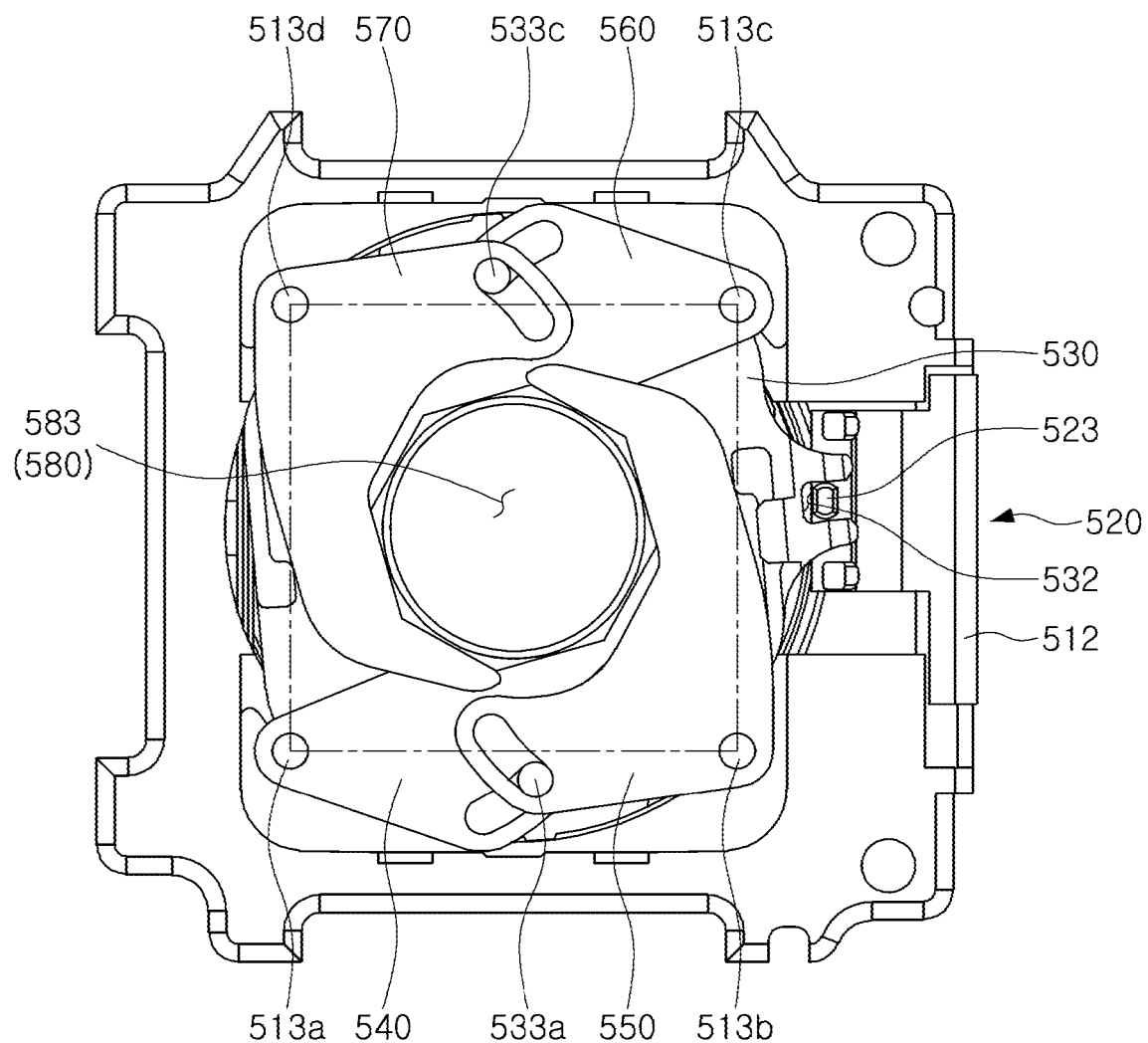

In addition, in order to form a distance as long as possible from the fixing shafts 513a, 513b, 513c, and 513d to the driving shafts 533a and 533c, the driving shafts 533a and 533c may be provided outside a rectangle formed by connecting fixing shafts 513a, 513b, 513c, and 513d, four rotating shafts (see FIGS. 8A to 8C). Accordingly, even when the driving shafts 533a and 533c are located at a point spaced apart from two fixing shafts 513a and 513c, respectively, by the same distance, the driving shafts 533a and 533c may be provided outside a rectangle formed by connecting the four rotating shafts (see FIG. 7).

In an example, the first to fourth blades 540, 550, 560, and 570 are interlocked with the rotary plate 530. Moreover, when the moving portion 520 linearly moves due to an electromagnetic effect between the driving magnet 521a and the driving coil 521b, the rotary plate 530 interlocked with the same rotates. Accordingly, the first to fourth blades 540, 550, 560, and 570 also move, so a diameter of an aperture can be changed.

An aperture driving unit is disposed in the base 510 so as to be movable along an axis, and includes a moving portion 520 having a magnet 521a and a driving coil 521b fixed to the housing 110 to oppose the magnet 521a.

The driving coil 521b is provided in the substrate 900, and the substrate 900 is fixed to the housing 110. The substrate 900 may be electrically connected to a printed circuit board attached to a bottom of the camera module 1000.

The moving portion 520 is provided with a moving member moving in the optical axis direction, the first direction, and the second direction together with the base 510, the driving coil 521b is provided as a fixed member fixed to the housing 110.

Since the driving coil 521b, providing driving force to the aperture module 500, is disposed outside the aperture module 500, that is, in the housing 110 of a camera module, weight of the aperture module 500 may be reduced.

In other words, since the driving coil 521b providing driving force to the aperture module 500 is provided as a fixed member, the driving coil 521b does not move during the autofocusing or optical image stabilization operation. Accordingly, an increase in a weight of the lens module 200 caused by an application of the aperture module 500 may be significantly reduced.

Moreover, the driving coil 521b, providing driving force to the aperture module 500, is disposed in the housing 110, a fixed member, and is then electrically connected to a printed circuit board attached to the bottom of the camera module 1000. Thus, even when the lens module 200 and the aperture module 500 move during the focusing and the shaking compensation, the driving coil 521b of the aperture driving unit may not be affected.

Thus, an autofocusing function can be prevented from being degraded.

Moreover, in an example, since a size of the entrance hole 580 of an aperture can be successively changed, a position of the moving portion 520 may be accurately sensed in order to accurately implement a size of an entrance hole. In this regard, in an example, a position sensor 521c disposed to oppose the driving magnet 521a of the moving portion 520 to determine a position of the driving magnet 521a may be included. The position sensor 521c may be provided as a hall sensor, and may be installed at the center of the driving coil 521b fixed to the housing 110 or adjacent thereto. For example, the position sensor 521c may be provided in the substrate 900 with the driving coil 521b provided therein.

In an example, when the moving portion 520 is allowed to linearly move, a closed-loop feedback control method is provided by detecting a position of the moving portion 520. Thus, the position sensor 521c may be used for the closed-loop control.

Moreover, in the substrate 900, a gyro sensor (not illustrated) detecting a shaking factor such as user hand-shake, or the like, and a driving circuit element (a driver IC, not illustrated) providing a driving signal to the plurality of coils 810b, 830b, 730, and 521b, may be provided.

A moving guide 512 with the moving portion 520 disposed therein may be provided in the base 510. The moving guide 512 may have a shape extended from the base 510 in an optical axis direction. Moreover, when the fixing shafts 513a, 513b, 513c, and 513d, rotating shafts on which the four blades. 540. 550. 560, and 570 are disposed, respectively, are interconnected, a rectangle having a long side and a short side, shorter than the long side, may be formed. Here, the moving portion 520 may be provided on the long side of the rectangle.

The moving portion 520 includes a driving magnet 521a disposed to oppose the driving coil 521b and a magnet holder 522 to which the driving magnet 521a is coupled. The driving magnet 521a is provided to oppose the driving coil 521b in a direction, perpendicular to an optical axis direction.

The moving portion 520 moves while being in close contact with the moving guide 512 of the base 510. Accordingly, a yoke 515 may be provided in the moving guide 512 to allow the moving portion 520 to be in close contact with the moving guide 512 due to an attractive force with the driving magnet 521a of the moving portion 520. For example, another yoke 225 may be provided in a position opposing the moving portion 520 of the lens module 200. Due to the attractive force between the yokes 515 and 225 as well as the driving magnet 521a, the moving portion 520 may slidably move while being in close contact with the moving guide 512.

Moreover, a bearing may be provided in the base 510 to allow sliding movement of the moving portion 520 to be easily performed. For example, as illustrated in FIG. 5, a ball bearing 516 may be provided between the moving portion 520 and the moving guide 512, and seating grooves 516a and 516b, on which the ball bearing 516 is seated, may be selectively provided in the moving portion 520 and the moving guide 512. Here, the bearing is not limited to the ball bearing. For example, the bearing may have a rod or plate shape allowing sliding movement to be easily performed.

When power is applied to the driving coil 521b, the moving portion 520 may move in a direction, perpendicular to an optical axis direction due to an electromagnetic influence between the driving magnet 521a and the driving coil 521b.

A guide groove 511 for guiding rotary motion of the rotary plate 530 is provided in the base 510, and the rotary plate 530 is inserted into the guide groove 511 to be guided so as to rotate.

In addition, a guide hole 532 formed to be elongated in a direction may be provided in the rotary plate 530. The guide hole 532 may be provided to be long and inclined in a moving direction of the moving portion 520. The guide hole 532 may have a hole or groove shape. For reference, in the drawings, it is illustrated that the guide hole 532 has a groove shape with an open one side.

Thus, when the moving portion 520 moves along an axis, a driving projection 523 provided in the moving portion 520 may move in the guide hole 532. According to movement of the driving projection 523, the rotary plate 530 rotates inside the guide groove 511. While the first to fourth blades 540, 550, 560, and 570, interlocked with the rotary plate 530, are narrowed or expanded, a size of the entrance hole 580 may be changed in multiple stages or successively (see FIGS. 8A to 8C).

FIGS. 8A to 8C are plan views illustrating an aperture module driven while a size of an entrance hole is changed in multiple stages or successively.

Referring to FIG. 8A, when the moving portion 520 is provided in an end of one side, an entrance hole 581 having a smallest size may be implemented due to the first to fourth blades 540, 550, 560, and 570 expanded.

In addition, referring to FIG. 8B, when the moving portion 520 is moved from an end of one side to the other side by a predetermined distance (moved to an approximately intermediate position), the first to fourth blades 540, 550, 560, and 570 rotate, so an entrance hole 582 having a medium size may be implemented.

Moreover, referring to FIG. 8C, when the moving portion 520 is moved to an end of the other side, opposite to the one side, by driving the aperture driving unit, the first to fourth blades 540, 550, 560, and 570 rotate, so an entrance hole 583 having a largest size may be implemented.

As described above with reference to FIGS. 8A to 8C, when the moving portion 520 moves from an end of the one side to an end of the other side direction, and then returns to the end of the one side again, due to the first to fourth blades 540, 550, 560, and 570 narrowed or expanded as the case may be, a size may be changed from entrance holes 582, having a relatively intermediate size, and 583, having a relatively large size, to an entrance hole 581 having a relatively small size.

In addition, when the moving portion 520 moves between an end of the one side and an end of the other side by driving the aperture driving unit, an entrance hole 582 having any size between an entrance hole 581 having a smallest size and an entrance hole 583 having a largest size may be implemented in various ways due to the first to fourth blades 540, 550, 560, and 570.

Referring to FIGS. 9A and 9B, the camera module 1000, according to the examples described herein, may be a mobile device, such as a portable electronic device 1, and further include a display unit 10, wherein the camera module 1000 is installed as a front camera of the portable electronic device 1 along with the display unit 10 or as a back camera on a side of the portable electronic device 1 other than a side with the display unit 10. As described in the various examples, an electrical signal converted by an image sensor of the camera module 1000 may be output as an image via the display unit 10 of the portable electronic device 1.

As described above, the aperture module 500 according to the one or more examples described herein may allow entrance holes having various sizes to be implemented successively by a linear reciprocating motion of the moving portion 520.

As described in the examples above, in a camera module according to one or more examples, an incident amount of light may be selectively changed through an aperture module. Moreover, when an aperture module is mounted, an autofocusing function may be prevented from being degraded, and an increase in weight caused by an application of an aperture module may be significantly reduced. Further, a thickness of an aperture module may be reduced, and power consumption due to aperture driving may be significantly reduced.

As set forth above, according to the examples described herein, an aperture module, capable of implementing an aperture successively and accurately, while reducing the use of a current, may be provided.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of this disclosure is defined not by the detailed description, but by the claims and their equivalents, and all variations within the scope of the claims and their equivalents are to be construed as being included in this disclosure.

What is claimed is:

1. An aperture module, comprising:
a rotary plate disposed on a base;
an aperture driving unit driving rotation of the rotary plate; and
a plurality of blades interlocked with rotation of the rotary plate, and forming entrance holes having various sizes through combinations,
wherein the plurality of blades are disposed on respective fixing shafts disposed on the base and rotated and driven around the respective fixing shafts,
wherein the plurality of blades are interlocked with respective driving shafts disposed on the rotary plate and driven by rotation of the rotary plate, and
wherein at least two blades, among the plurality of blades, share a driving shaft of the driving shafts.

2. The aperture module of claim 1,
wherein the plurality of blades includes four blades, and the fixing shafts on which the four blades are disposed are interconnected to form a rectangle having a long side and a short side.

3. The aperture module of claim 2, wherein each driving shaft is disposed between two fixing shafts, which are adjacent to each other, and wherein each driving shaft is disposed to pass through a point spaced apart from the two adjacent fixing shafts by the same distance according to rotation of the rotary plate.

4. The aperture module of claim 3, wherein when each driving shaft is located at the point spaced apart from the two adjacent fixing shafts by the same distance, the driving shaft is disposed outside the short side of the rectangle.

5. The aperture module of claim 2, wherein the driving shafts are disposed outside the rectangle.

6. The aperture module of claim 2, wherein the two blades disposed on the shared driving shaft are disposed to overlap each other.

7. The aperture module of claim 2, wherein blades not sharing a driving shaft, among the four blades, are disposed at substantially the same position in an optical axis direction.

8. The aperture module of claim 7, wherein the rotary plate and the four blades are mutually stacked to form three layers.

9. The aperture module of claim 8, wherein the four blades are divided by two and disposed in two layers, and
wherein two blades disposed in the same layer comprise the same shape.

10. The aperture module of claim 8, wherein the four blades serve as a stopper among blades disposed in the same layer.

11. The aperture module of claim 2, wherein the entrance holes implemented due to combination of the four blades are octagonal.

12. The aperture module of claim 2, wherein the aperture driving unit comprises a moving portion comprising a driving magnet, the moving portion reciprocating linearly, and
wherein the moving portion is disposed outside the long side of the rectangle.

13. The aperture module of claim 12, wherein the rotary plate and the moving portion selectively comprise a driving projection or a guide hole, and
the driving projection is inserted into the guide hole.

14. The aperture module of claim 13, wherein the driving projection comprises a shape protruding in an optical axis direction.

15. The aperture module of claim 14, wherein the guide hole is a groove having a semicircular shape which is open in a direction perpendicular to an optical axis direction.

16. A camera module comprising
a housing;
a lens module accommodated in the housing;
the aperture module of claim 1 disposed on the lens module;
a first optical image stabilization (OIS) driving coil providing driving force to move the lens module in a first direction perpendicular to an optical axis direction;
a second OIS driving coil providing driving force to move the lens module in a second direction perpendicular to the optical axis direction and the first direction; and
an autofocus (AF) driving coil providing driving force to move the lens module in the optical axis direction,
wherein the aperture driving unit comprises an aperture driving coil facing a driving magnet disposed in a moving portion on the base driving the rotation of the rotary plate.

17. A portable electronic device comprising:
the camera module of claim 16;
an image sensor configured to convert light that passes through the lens module into an electrical signal; and
a display configured to convert the electrical signal into a display image.

18. A camera module, comprising:
a housing;
a lens module accommodated in the housing; and
an aperture module forming octagonal entrance holes having various sizes with four blades,
wherein the four blades are disposed on respective fixing shafts disposed on a base, and the respective fixing shafts are interconnected to form a rectangle having a long side and a short side, and
wherein four sides, parallel to an optical axis direction of the housing, comprise a first optical image stabilization (OIS) driving coil providing driving force to move the lens module in a first direction perpendicular to an optical axis direction, a second OIS driving coil providing driving force to move the lens module in a second direction perpendicular to the optical axis direction and the first direction, an autofocus (AF) driving coil providing driving force to move the lens module in the optical axis direction, and an aperture driving coil driving the blades of the aperture module.

19. A portable electronic device comprising:
the camera module of claim 18;
an image sensor configured to convert light that passes through the lens module into an electrical signal; and
a display configured to convert the electrical signal into a display image.

* * * * *